United States Patent
Huang et al.

(10) Patent No.: US 11,261,368 B2
(45) Date of Patent: Mar. 1, 2022

(54) SILICON DIOXIDE JANUS NANOSHEETS RELATIVE PERMEABILITY MODIFIER (RPM) FOR REDUCING SUBTERRANEAN FORMATION WATER PERMEABILITY IN CARBONATE AND SANDSTONE FORMATIONS

(71) Applicant: Saudi Arabian Oil Company, Dhahran (SA)

(72) Inventors: Jin Huang, Dhahran (SA); Feng Liang, Cypress, TX (US); Wengang Li, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/904,211

(22) Filed: Jun. 17, 2020

(65) Prior Publication Data
US 2021/0395601 A1    Dec. 23, 2021

(51) Int. Cl.
*C09K 8/516*    (2006.01)
*C09K 8/502*    (2006.01)
(Continued)

(52) U.S. Cl.
CPC .............. *C09K 8/516* (2013.01); *C09K 8/502* (2013.01); *C09K 8/506* (2013.01); *E21B 43/16* (2013.01); *C09K 2208/10* (2013.01)

(58) Field of Classification Search
None
See application file for complete search history.

(56) References Cited

U.S. PATENT DOCUMENTS 7,552,771 B2    6/2009    Eoff et al.
9,228,940 B2 *  1/2016    Pelletier ................ E21B 47/005
(Continued)

FOREIGN PATENT DOCUMENTS

WO    2017011328 A1    1/2017
WO    2019027817 A1    2/2019

OTHER PUBLICATIONS

Babaei, M. et al.; "Promising gene delivery system based on polyethylenimine-modified silica nanoparticles" Cancer Gene Therapy (2017) 00; pp. 1-9.
(Continued)

*Primary Examiner* — John J Figueroa
(74) *Attorney, Agent, or Firm* — Bracewell LLP; Constance G. Rhebergen; Brian H. Tompkins

(57) ABSTRACT

A silicon oxide Janus nanosheets relatively permeability modifier (RPM) for carbonate and sandstone formations. The silicon oxide Janus nanosheets RPM may be used to treat a water and hydrocarbon producing carbonate or sandstone formation to reduce water permeability in the formation and increase the production of hydrocarbons. The silicon oxide Janus nanosheets RPM for carbonate formations includes a first side having negatively charged functional groups and a second side having alkyl groups. The silicon oxide Janus nanosheets RPM for sandstone formations includes a first side having positively charged functional groups and a second side having alkyl groups. The negatively charged functional groups may include a negatively charged oxygen group groups and hydroxyl groups. The positively charged functional groups may include amino groups and an amine. Methods of reducing water permeability using the silicon oxide Janus nanosheets RPM and methods of manufacturing the silicon oxide Janus nanosheets RPM are also provided.

13 Claims, 6 Drawing Sheets

(51) Int. Cl.
   *E21B 43/16*   (2006.01)
   *C09K 8/506*   (2006.01)

(56)          References Cited

U.S. PATENT DOCUMENTS

| | | | |
|---|---|---|---|
| 9,484,079 | B2 | 11/2016 | Salla et al. |
| 9,708,525 | B2 | 7/2017 | Suresh et al. |
| 9,708,896 | B2 * | 7/2017 | Suresh .................... E21B 43/20 |
| 9,784,079 | B2 | 10/2017 | Salla et al. |
| 9,790,415 | B1 | 10/2017 | Jiang et al. |
| 10,036,239 | B2 | 7/2018 | Salla et al. |
| 10,053,613 | B1 | 8/2018 | Kalgaonkar |
| 2012/0015852 | A1 * | 1/2012 | Quintero .................. C09K 8/32 507/112 |
| 2012/0245058 | A1 | 9/2012 | Monteiro et al. |
| 2017/0015896 | A1 | 1/2017 | Cox et al. |
| 2017/0204718 | A1 * | 7/2017 | Pearl, Jr. ................. E21B 33/13 |
| 2017/0218250 | A1 | 8/2017 | Boul et al. |
| 2018/0086971 | A1 | 3/2018 | Al-Muntasheri et al. |
| 2018/0320053 | A1 | 11/2018 | Kalgaonkar et al. |
| 2018/0327649 | A1 | 11/2018 | Kalgaonkar |
| 2018/0327652 | A1 | 11/2018 | Kuznetsov et al. |
| 2019/0010377 | A1 | 1/2019 | Boul et al. |
| 2019/0010382 | A1 | 1/2019 | Kuznetsov et al. |
| 2019/0016943 | A1 * | 1/2019 | Ren ....................... C09K 8/584 |

OTHER PUBLICATIONS

Buchman, Yekaterina Kapilov et al.; "Silica Nanoparticles and Polyethyleneimine (PEI)—Mediated Functionalization: A New Method of PEI Covalent Attachment for siRNA Delivery Applications" Bioconjugate Chem. Nov. 4, 2013; pp. 1-41.

Gao, Tao et al.; "Monodisperse Hollo Silica Nanospheres for Nano Insulation Materials: Synthesis, Characterization, and Life Cycle Assessment" ACS Appl. Mater. Interfaces 2013, 5; pp. 761-767.

Guo, Qian et al.; "Effects of Surface-Modified Alkyl Chain Length of Silica Fillers on the Rheological and Thermal Mechanical Properties of Underfill" IEEE Trans. on Components, Packaging & Man. Tech., vol. 6, No. 12, Dec. 2016; pp. 1796-1803.

Hummers, William S. et al.; "Preparation of Graphitic Oxide" JACS, Mar. 20, 1958, 80; p. 1339.

Liang, Feng et al.; "Reduced-Polymer-Loading, High-Temperature Fracturing Fluids by Use of Nanocrosslinkers" SPE 177469, Apr. 2017 SPE Journal; pp. 622-631.

Liang, Fuxin et al.; "Inorganic Janus Nanosheets" Agnew. Chem. Int. Ed. 2011, 50; pp. 2379-2382.

Liang, Fuxin et al.; "Janus hollow spheres by emulsion interfacial self-assembled sol-gel process" Chem. Commun., 2011, 47; pp. 1231-1233.

Luo, Dan et al.; "Nanofluid of graphene-based amphiphilic Janus nanosheets for tertiary or enhanced oil recovery: High performance at low concentration" PNAS Jul. 12, 2016, vol. 113, No. 28; pp. 7711-7716.

Luo, Dan et al.; "Secondary Oil Recovery Using Graphene-based Amphiphillic Janus Nanosheet Fluid at Ultralow Concentration" Industrial & Engineering Chemistry Research, 56 (39), 2017; pp. 11125-11132.

Sandberg, Linn Ingunn C. et al.; "Synthesis of Hollow Silica Nanospheres by Sacrificial Polystyrene Templates for Thermal Insulation Applications" Advances in Materials Science & Engineering vol. 2013, Art ID 483651; pp. 1-6.

Sheng, Li et al.; "Janus Silica Hollow Spheres Prepared via Interfacial Biosilicification" American Chemical Society, Langmuir 2015, 31; pp. 11964-11970.

Wu, Hao et al; "Janus graphene oxide nanosheets prepared via Pickering emulsion template" Carbon 93, 2015; pp. 473-483.

Yin, Taiheng et al.; "Physicochemical properties and potential applications of silica-based amphiphilic Janus nanosheets for enhanced oil recovery" Fuel 237 (2019); pp. 344-351.

Zhao, Xubo et al.; "Biocompatible graphene oxide as a folate receptor—targeting drug delivery system for the controlled release of anti-cancer drugs" Royal Soceity of Chemistry Adv., 2014, 4; pp. 24232-24239.

International Search Report and Written Opinion for International Application No. PCT/US2021/037888, report dated Sep. 22, 2021; pp. 1-16.

International Search Report and Written Opinion for International Application No. PCT/US2021/037897, report dated Sep. 21, 2021; pp. 1-15.

International Search Report and Written Opinion for International Application No. PCT/US2021/037908, report dated Sep. 16, 2021, pp. 1-15.

Luo, Dan et al.; "Synthesis of graphene-based amphiphilic Janus nanosheets via manipulation of hydrogen bonding" Carbon 126, 2018; pp. 105-110.

Zhao, Ziguang et al.; "Dually Responsive Janus Composite Nanosheets" Macromolecules, vol. 48, No. 11, ACS Publications, American Chemical Society, May 29, 2015; pp. 3598-3603.

U.S. Appl. No. 16/904,174, filed Jun. 17, 2020 and titled "Graphene Oxide Janus Nanosheets Relative Permeability Modifier (RPM) for Reducing Subterranean Formation Water Permeability in Carbonate Formations".

U.S. Appl. No. 16/904,253, filed Jun. 17, 2020 and titled "Methods and Compositions for Treating Thief Zones in Carbonate Formations Using Crosslinked Polymeric Systems with Graphene Oxide Janus Nanosheets Crosslinker".

U.S. Appl. No. 16/904,275, filed Jun. 17, 2020 and titled "Methods and Compositions for Treating Thief Zones in Carbonate Formations Using Crosslinked Polymeric Systems with Silicon Dioxide Janus Nanosheets Crosslinker".

* cited by examiner

SILICON DIOXIDE JANUS NANOSHEETS RELATIVE PERMEABILITY MODIFIER (RPM) FOR REDUCING SUBTERRANEAN FORMATION WATER PERMEABILITY IN CARBONATE AND SANDSTONE FORMATIONS

BACKGROUND

Field of the Disclosure

The present disclosure generally relates to the production of hydrocarbons such as oil and gas from subterranean formations. More specifically, embodiments of the disclosure relate to water control in subterranean wells for production of hydrocarbons.

Description of the Related Art

Water control presents a significant challenge in the production of hydrocarbons, both financially and environmentally. For example, under some estimations it requires at least the same amount of energy to produce a barrel of water as it does to recover a barrel of oil. Excess water production detrimentally affects the economic life of hydrocarbon producing wells and also causes many other oilfield-related problems, such as scale deposition, fines migration, corrosion, etc.

SUMMARY

In the past decades, many different methods have been developed to control water production in hydrocarbon wells. Such methods including mechanical isolation and chemical treatments. A Relative Permeability Modifier (RPM), among other chemical material systems, is considered as one method of controlling unwanted water production in hydrocarbon reservoirs. A RPM treatment is generally in the form of weak solution of low viscosity and, can be pumped into a hydrocarbon formation, typically by bullhead injection or as fracture additives, to reduce water permeability without significantly affecting oil permeability.

A RPM treatment may be applied directly to producing wells and, in some instances, to injection wells. The simplicity of deployment (for example, bullhead injection requires no zonal isolation) and capability of disproportionate permeability reduction may render RPM an advantageous water control method to cut production costs in those environments where zones cannot be mechanically isolated or permanent total blockage is not possible.

However, the majority of commercially available water control chemicals, including RPMs, are designed for sandstone formations and not suitable for carbonate formations. The available water control chemicals are not designed to form chemical bonds to the carbonate rock surface under reservoir conditions. Moreover, commercially available water control chemicals may not perform adequately in sandstone formations. Consequently, there is a need for an improved chemicals and techniques for controlling water production in and that may be used in both carbonate formations and sandstone formations.

In one embodiment, a silicon oxide Janus nanosheet relatively permeability modifier (RPM) is provided. The silicon oxide Janus nanosheet RPM includes a functional group bonded to the first side, the functional group selected from the group consisting of COOH, COO$^-$, OH, and O$^-$, or the functional group selected from the group consisting of NH$_2$ and an amine. The silicon oxide Janus nanosheet RPM also includes an alkyl group linked to the second side, the alkyl group selected from the group consisting of a C8-C30 alkyl.

In some embodiments, the alkyl group is bonded to the second side by an oxygen atom. In some embodiments, the degree of hydrophobic alkyl functionality of the second side is in the range of 0.01 weight (wt) % to 40 wt %. In some embodiments, the silicon oxide nanosheet has a thickness in the range of in the range of 24 nanometers (nm) to 95 nm.

In another embodiment, a method for reducing water permeability of a carbonate formation is provided. The method includes introducing a carrier fluid that includes a silicon oxide Janus nanosheet relatively permeability modifier (RPM) into the carbonate formation. The silicon oxide Janus nanosheet RPM includes a functional group bonded to the first side, the functional group selected from the group consisting of COOH, COO$^-$, OH, and O$^-$. The silicon oxide Janus nanosheet RPM also includes an alkyl group linked to the second side, the alkyl group selected from the group consisting of a C8-C30 alkyl.

In some embodiments, the alkyl group is bonded to the second side by an oxygen atom. In some embodiments, the degree of hydrophobic alkyl functionality of the second side is in the range of 0.01 weight (wt) % to 40 wt %. In some embodiments, the silicon oxide nanosheet has a thickness in the range of in the range of 24 nanometers (nm) to 95 nm. In some embodiments, the carrier fluid is a polar solvent. In some embodiments, the carrier fluid is water.

In another embodiment, a method of manufacturing a silicon oxide Janus nanosheet relatively permeability modifier (RPM) is provided. The method includes preparing a silicon oxide nanosphere and functionalizing the surface of the silicon oxide nanosphere using an alkyl silane to produce a surface-functionalized silicon oxide nanosphere. The method also includes crushing the surface-functionalized silicon oxide nanosphere to form a silicon oxide Janus nanosheets RPM. The silicon oxide Janus nanosheets RPM includes a silicon oxide nanosheet having a first side and a second side, a functional group bonded to the first side, the functional group selected from the group consisting of COOH, COO$^-$, OH, or O$^-$, and an alkyl group linked to the second side, the alkyl group selected from the group consisting of a C8-C30 alkyl.

In some embodiments, the alkyl group is bonded to the second side by an oxygen atom. In some embodiments, the degree of hydrophobic alkyl functionality of the second side is in the range of 0.01 weight (wt) % to 40 wt %. In some embodiments, the alkyl silane is octyltrimethoxysilane (OTMS) or octadecyltrimethoxysilane (ODTMS). In some embodiments, preparing a silicon oxide nanosphere includes preparing a template nanosphere of a polystyrene nanosphere, growing silicon oxide on a nucleation site on a surface of the template nanosphere, and removing the template nanosphere via heat.

In another embodiment, a method for reducing water permeability of a sandstone formation is provided. The method includes introducing a carrier fluid that includes a silicon oxide Janus nanosheet relatively permeability modifier (RPM) into the carbonate formation. The silicon oxide Janus nanosheet RPM includes a functional group bonded to the first side, the functional group selected from the group consisting of NH$_2$ and an amine. The silicon oxide Janus nanosheet RPM also includes an alkyl group linked to the second side, the alkyl group selected from the group consisting of a C8-C30 alkyl.

In some embodiments, the alkyl group is bonded to the second side by an oxygen atom. In some embodiments, the degree of hydrophobic alkyl functionality of the second side is in the range of 0.01 weight (wt) % to 40 wt %. In some embodiments, the silicon oxide nanosheet has a thickness in the range of in the range of 24 nanometers (nm) to 95 nm. In some embodiments, the carrier fluid is a polar solvent. In some embodiments, the carrier fluid is water.

In another embodiment, a method of manufacturing a silicon oxide Janus nanosheet relatively permeability modifier (RPM) is provided. The method includes preparing an oil-silane mixture that includes an alkyl silane and adding a polystyrene-polyacrylic acid block copolymer to the oil-silane mixture to prepare an emulsion, the emulsion including a droplet having an external hydrophilic surface and an interior oleophilic surface. The method also includes dissolving an oil core of the droplet in a solvent to form a silicon oxide hollow nanosphere and crushing the silicon oxide hollow nanosphere to form the silicon oxide Janus nanosheets RPM. The silicon oxide Janus nanosheet RPM includes a silicon oxide nanosheet having a first side and a second side, a functional group bonded to the first side, the functional group selected from the group consisting of $NH_2$ and an amine, and an alkyl group linked to the second side, the alkyl group selected from the group consisting of a C8-C30 alkyl.

In some embodiments, the alkyl group is bonded to the second side by an oxygen atom. In some embodiments, the alkyl silane is octyltrimethoxysilane (OTMS) or octadecyltrimethoxysilane (ODTMS). In some embodiments, the oil-silane mixture is tetraethoxysilane (TEOS) and amido-propyltrimethoxysilane (APTMS). In some embodiments, the solvent is hexane.

DETAILED DESCRIPTION

Figure 1:
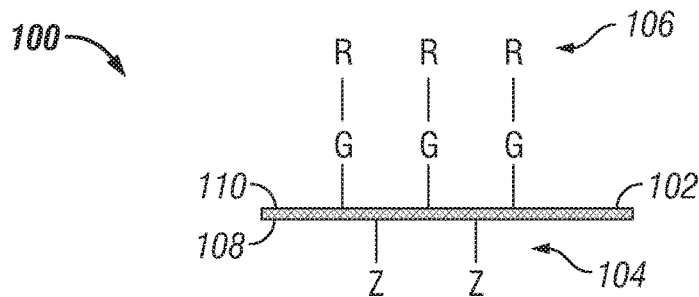
FIG. 1 shows the chemical structure of a silicon oxide Janus nanosheet relatively permeability modifier (RPM) in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a silicon oxide (silica) Janus nanosheet relatively permeability modifier (RPM) for carbonate formations. The silicon oxide Janus nanosheets RPM may be used to treat a water and hydrocarbon producing carbonate formation to reduce water permeability in the formation and increase the production of hydrocarbons. The silicon oxide Janus nanosheets RPM includes a hydrophobic side having alkyl groups and an "anionic" side having negatively charged groups. As discussed in the disclosure, the alkyl groups may include C8 to C30 alkyls. The negatively charged groups may include a negatively charged oxygen group groups and hydroxyl groups.

The silicon oxide Janus nanosheets RPM may be introduced into a carbonate formation such that the anionic side attaches to the rock surface of pores of the carbonate formation via an ionic bond between the negatively charged groups and the positively charged calcium ions ($Ca^{2+}$) on the rock surface. The hydrophobic (opposite) side of the silicon oxide Janus nanosheets RPM faces the pore space. When water invades the pore space, the hydrophobic alkyl groups collapse and from a water resistant barrier in the pore space that impedes or completely blocks flow of the water. When oil invades the pore space, the hydrophobic alkyl groups extend and are soluble in the oil, enabling flow of the oil through the pore space.

The silicon oxide Janus nanosheets RPM may be synthesized from silicon oxide hollow nanospheres obtained commercially or prepared from template spheres, such as polystyrene spheres. The hydrophobic side of the silicon oxide Janus nanosheets RPM may be prepared by functionalizing the exterior surface of the silicon oxide hollow nanospheres using an alkyl silane, octyltrimethoxysilane (OTMS), octadecyltrimethoxysilane (ODTMS), or a combination thereof. The surface-functionalized silicon oxide hollow nanospheres may be crushed using a milling process to produce the silicon oxide Janus nanosheets RPM for carbonate formations. In some embodiments, the silicon oxide nanosheets RPM has a thickness in the range of in the range of 24 nanometers (nm) to 95 nm.

Embodiments of the disclosure also include a silicon oxide (silica) Janus nanosheet relatively permeability modifier (RPM) for sandstone formations. The silicon oxide Janus nanosheets RPM may be used to treat a water and hydrocarbon producing sandstone formation to reduce water permeability in the formation and increase the production of hydrocarbons. The silicon oxide Janus nanosheets RPM for sandstone formations includes a hydrophobic side having alkyl groups and a "cationic" side having positively charged groups. As discussed in the disclosure, the alkyl groups may include C8 to C30 alkyls. The positively charged groups may include an amino ($NH_2$) group or amines (that is, molecules containing a basic nitrogen atom (N) with a lone pair of electrons).

The silicon oxide Janus nanosheets RPM may be introduced into a sandstone formation such that the cationic side attaches to the rock surface of pores in the sandstone formation via an ionic bond between the positively charged groups of the cationic side and the negatively charged silicate ions on the rock surface. The hydrophobic (opposite) side of the silicon oxide Janus nanosheets RPM faces the pore space. When water invades the pore space, the hydrophobic alkyl groups collapse and from a water resistant barrier in the pore space that impedes or completely blocks flow of the water. When oil invades the pore space, the hydrophobic alkyl groups extend and are soluble in the oil, enabling flow of the oil through the pore space.

In another embodiment, the silicon oxide Janus nanosheets RPM for sandstone formations includes a hydrophobic side having alkyl groups and a "covalent" side having hydroxyl groups or silane ester groups. In such embodiments, the covalent side of the silicon oxide Janus nanosheets RPM may attach to the sandstone rock surface via covalent bonding.

The silicon oxide Janus nanosheets RPM may be synthesized using an oil-silane mixture having an alkyl silane (for example, octadecyltrimethoxysilane (ODTMS)). The oil-silane mixture may include silanes such as tetraethoxysilane (TEOS) and amido-propyltrimethoxysilane (APTMS). An emulsion may be formed having spheres with a silicon oxide shell having an oil core and a Janus interface that includes an external hydrophilic surface and an interior oleophilic surface. The internal oil core of the spheres may be dissolved using a solvent to form silicon oxide hollow nanospheres having an exterior surface with amino groups or amines and an interior surface with alkyl groups. The silicon oxide hollow nanospheres may be crushed using a milling process to produce the silicon oxide Janus nanosheets RPM for sandstone formations. In some embodiments, the silicon oxide nanosheets RPM has a thickness in the range of in the range of 24 nanometers (nm) to 95 nm.

Structure of Silicon Oxide Janus Nano Sheets RPM for Carbonate Formations and Sandstone Formations FIG. 1 shows the structure of a silicon oxide Janus nanosheet relatively permeability modifier (RPM) 100 for carbonate or sandstone formations in accordance with an embodiment of the disclosure. As discussed in the disclosure, the silicon oxide Janus nanosheets RPM may reduce water permeability in subterranean carbonate or sandstone formations and improve hydrocarbon production from such formations.

As shown in FIG. 1, the silicon oxide Janus nanosheets RPM 100 includes a silicon oxide nanosheet 102 having a first side 104 (referred to as the "anionic" or "cationic" side) that includes negatively or positively charged functional groups and a second and opposite side 106 (referred to as the "hydrophobic" side) having hydrophobic functional groups. As used in the disclosure, term "negatively charged groups" may include groups that ionize by releasing a hydrogen (H) atom as a free proton. As discussed infra, in some embodiments the first side 104 includes negatively charged groups that enables the silicon oxide Janus nanosheet 100 to attach to the rock surface of a carbonate formation via interaction with calcium ions ($Ca^{2+}$) present on the carbonate rock surface. In other embodiments, the first side 104 includes positively charged groups that enables the silicon oxide Janus nanosheet 100 to attach to the rock surface of a sandstone formation via interaction with silicate ions (for example, $SiO_4^{2-}$) present on the sandstone rock surface. The second side 106 having hydrophobic functional groups provides a hydrophobic surface to control oil and water flow.

As first shown in FIG. 1, the first side 104 includes groups Z bonded to a surface 108 of the silicon oxide nanosheet 102. In embodiments in which the silicon oxide Janus nanosheets RPM 100 is for use in carbonate formations, Z is selected from the group consisting of hydroxyl (OH) a negatively charged oxygen group ($O^-$), and carboxyl (COOH, and $COO^-$)—. In embodiments in which the silicon oxide Janus nanosheets RPM 100 is for use in sandstone formations, Z is selected from the group consisting of $NH_2$ and an amine.

The second side 106 of the silicon oxide Janus nanosheets RPM 100 includes groups G bonded to the opposite surface 110 of the silicon oxide nanosheet 102 and groups R bonded to groups G. G is an oxygen atom (O). R is selected from the group consisting of C8 to C30 alkyls (that is an alkyl group having a number of carbon atoms in the range of 8 to 30). The degree of hydrophobic alkyl chain functionality of the silicon oxide Janus nanosheets RPM 100 provided by the R groups may be in the range of 0.01 weight (wt) % to 40 wt %.

Figure 2:
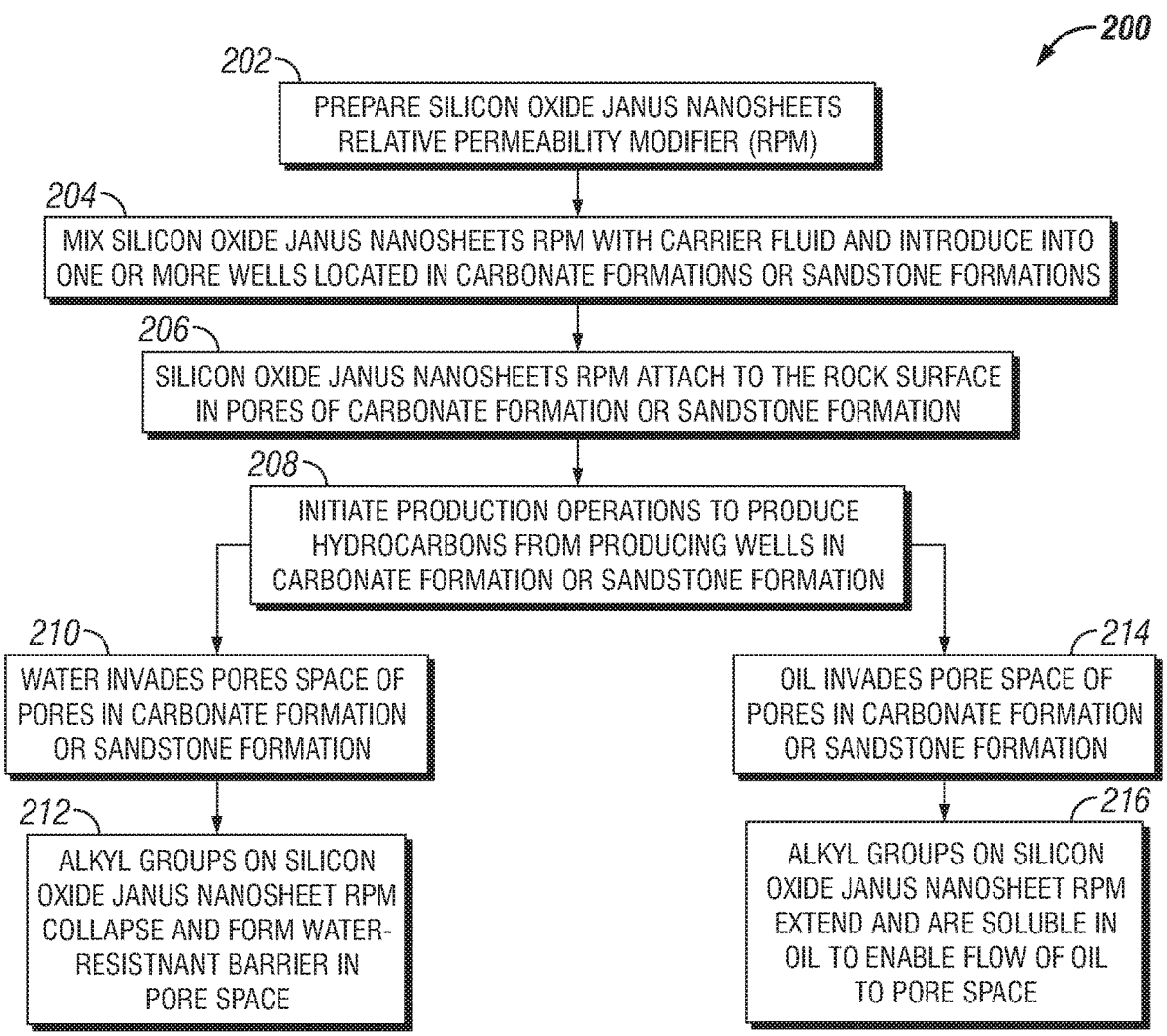
FIG. 2 is a block diagram of a process for using a silicon oxide Janus nanosheets RPM in accordance with an embodiment of the disclosure.

Process for Using Silicon Oxide Janus Nanosheets RPM in Carbonate Formations or Sandstone Formations FIG. 2 depicts a process 200 for using the silicon oxide Janus nanosheets RPM in accordance with an embodiment of the disclosure. Initially, a silicon oxide Janus nanosheets RPM may be prepared (block 202). The silicon oxide Janus nanosheets RPM may be prepared at a wellsite or, in some embodiments, prepared offsite and then transported to the wellsite. The silicon oxide Janus nanosheets RPM may be prepared based on use in a carbonate formation or a sandstone formation. For a carbonate formation, as discussed in the disclosure, the silicon oxide Janus nanosheets RPM may have an anionic side having negatively charged groups and a hydrophobic side having alkyl groups. For a sandstone formation, as discussed in the disclosure, the silicon oxide Janus nanosheets RPM may have a cationic side having positively charged groups and a hydrophobic side having alkyl groups. In another embodiment, the silicon oxide Janus nanosheets RPM for sandstone formations may have a covalent side having hydroxyl groups or silane ester groups and a hydrophobic side having alkyl groups.

Next, the silicon oxide Janus nanosheets may be mixed with a carrier fluid and introduced into one or more wells located in carbonate formations or sandstone formations (block 204). The carrier fluid may be a polar solvent (for example, water). In some embodiments, the silicon oxide Janus nanosheets may be introduced via bullhead injection. The one or more wells may include producing wells, injection wells, or a combination thereof. After injection, the silicon oxide Janus nanosheets RPM may attach to the rock surface in pores and other openings in the carbonate formation or sandstone formation (block 206). In embodiments used in carbonate formations, the silicon oxide Janus nanosheets RPM may attach to the rock surface of a carbonate formation due to the ionic interaction between the negatively charged side of the silicon oxide Janus nanosheets RPM and the positively charged calcium ions ($Ca^{2+}$) on the rock surface, such that the alkyl groups of the hydrophobic side of the silicon oxide Janus nanosheets are oriented toward a pore space or other opening. In embodiments used in sandstone formations, the silicon oxide Janus nanosheets RPM may attach to the rock surface of a sandstone formation due to the ionic interaction between the positively charged side of the silicon oxide Janus nanosheets and the negatively charged silicate ions on the rock surface, such that the alkyl groups of the hydrophobic side of the silicon oxide Janus nanosheets are oriented toward a pore space or other opening.

Next, production operations may be initiated (block 208) to produce hydrocarbons from a hydrocarbon-bearing carbonate formation or sandstone formation with reduced water production from the one or more wells having the silicon oxide Janus nanosheets RPM. When water invades openings (such as pores) (block 210), the hydrophobic alkyl groups collapse and from a water resistant barrier in the openings (such as in the pore space) that impedes or completely blocks flow of the water (block 212). When oil invades the openings (block 214), the hydrophobic alkyl groups extend and are soluble in the oil, enabling flow of the oil through the openings (block 216).

Figure 3:
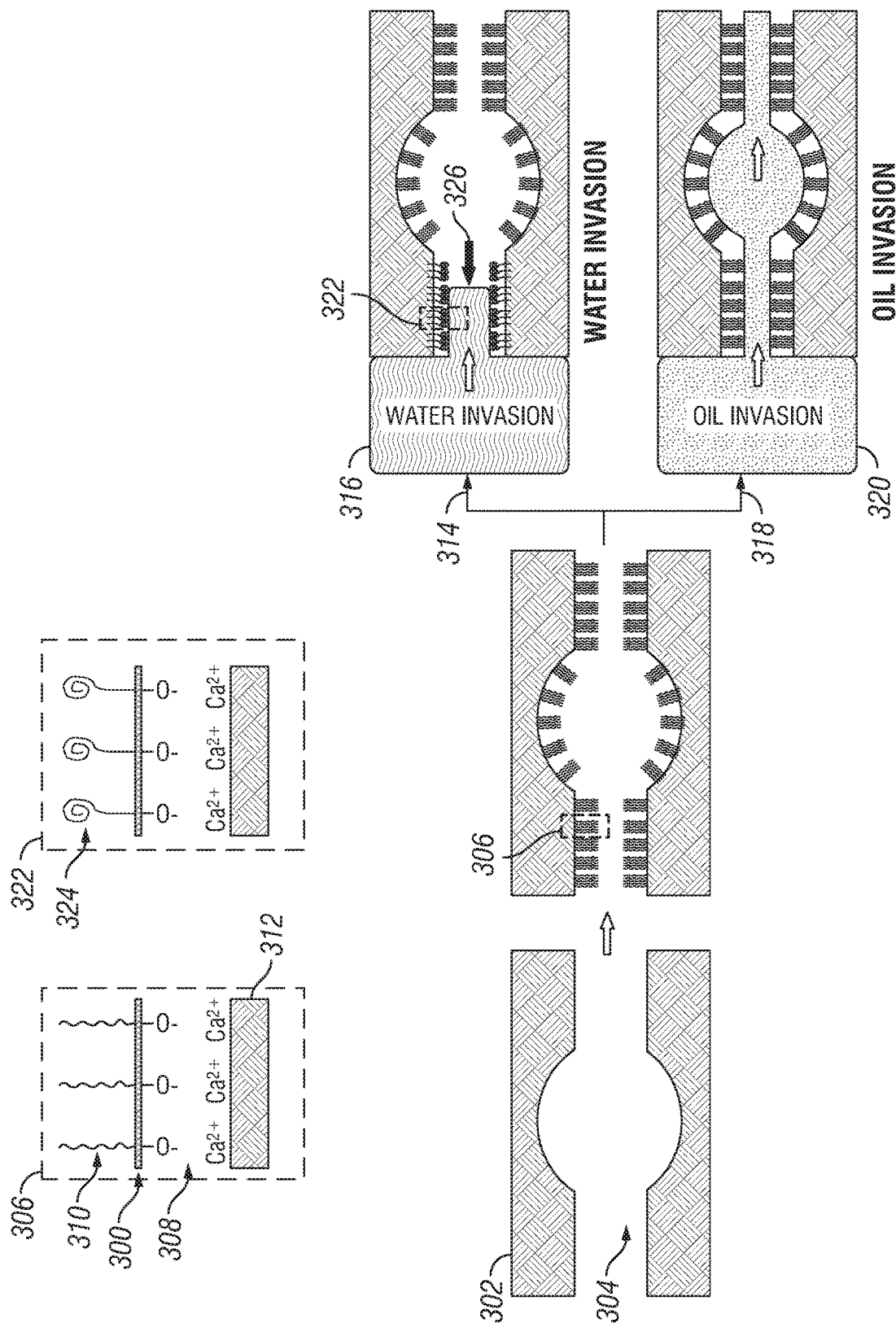
FIG. 3 is a schematic diagram depicting the mechanism of a silicon oxide Janus nanosheets RPM in a carbonate formation in accordance with an embodiment of the disclosure.

FIG. 3 is depicts the mechanism of a silicon oxide Janus nanosheets RPM 300 in a carbonate formation 302 in accordance with an embodiment of the disclosure. FIG. 3 illustrates a pore 304 in the carbonate formation 302 that enables the flow of hydrocarbons from a hydrocarbon reservoir located in the formation 302. As will be appreciated, such formations may also produce water. As described in the disclosure, the silicon oxide Janus nanosheets RPM 300 may modify the permeability of the pore 304 to decrease the permeability of the pore 304 to water and without decreasing the permeability of the pore 304 to hydrocarbons.

As shown in inset 306 in FIG. 3, the silicon oxide Janus nanosheets RPM 300 includes a first side 308 having negatively charged groups (by way of example, only a negatively charged oxygen group groups are shown in the inset 306). The silicon oxide Janus nanosheets RPM 300 includes a hydrophobic side 310 opposite the first side 308 and having alky groups. As also shown in inset 306, the first side 308 interacts with the calcium ions ($Ca^{2+}$) on the surface 312 of the carbonate formation 302 to attach the first side 308 of the silicon oxide Janus nanosheets RPM 300 to the carbonate formation. After attaching the second side silicon oxide Janus nanosheets RPM 300 to the carbonate formation, the second side 308 of the silicon oxide Janus nanosheets RPM 300 is oriented toward the pore space of the pore 304.

As illustrated in FIG. 3, the silicon oxide Janus nanosheets RPM 300 provides different permeability of the carbonate formation 302 depending on the fluid (that is, water or oil) in the channel 304. Line 314 is directed to the mechanism of the silicon oxide Janus nanosheets RPM 300 when water 316 is invading the pore 304, and line 318 of FIG. 3 is directed to the mechanism of the silicon oxide Janus nanosheets RPM 300 when oil 320 is invading the channel 304.

As shown in inset 322, when the water 316 is in the pore 304, the hydrophobic alkyl groups collapse and from a water resistant barrier 324 in the pore space of the pore 304 that impedes or completely blocks flow of the water 316. In some instances, after collapse of the alkyl groups, a capillary effect may act to flow the water 316 in the opposite direction of the water invasion, as shown by arrow 326.

As shown by line 318, when oil 320 is in the pore 304, the hydrophobic alkyl groups extend and are soluble in the oil 320, enabling flow of the oil 310 in the pore space of the pore 304.

Figure 4:
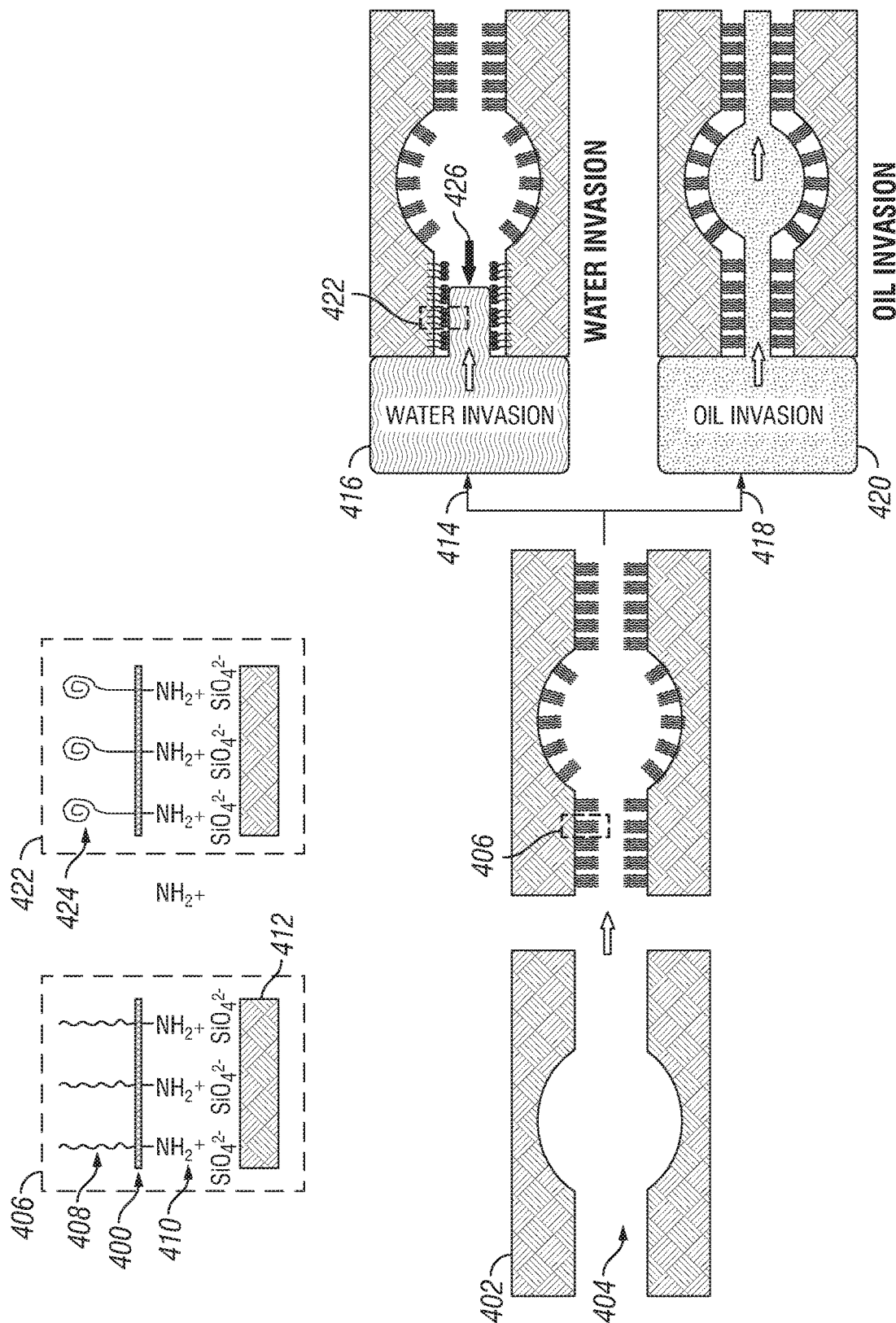
FIG. 4 is a schematic diagram depicting the mechanism of a silicon oxide Janus nanosheets RPM in a sandstone formation in accordance with an embodiment of the disclosure.

FIG. 4 depicts the mechanism of a silicon oxide Janus nanosheets RPM 400 in a sandstone formation 402 in accordance with an embodiment of the disclosure. FIG. 4 illustrates a pore 404 in the sandstone formation 402 that may provide for the flow of hydrocarbons from a hydrocarbon reservoir located in the formation 402 or the flow water. As described in the disclosure, the silicon oxide Janus nanosheets RPM 400 may modify the permeability of the pore 404 in the sandstone formation 402 to decrease the permeability of the pore 404 to water and without decreasing the permeability of the pore 404 to hydrocarbons.

As shown in inset 406 in FIG. 4, the silicon oxide Janus nanosheets RPM 400 includes a first side 408 having positively charged groups (by way of example, amino ($NH_2$) groups are shown in the inset 406). The silicon oxide Janus nanosheets RPM 400 includes a hydrophobic side 410 opposite the first side 408 and having alky groups. As also shown in inset 406, the first side 408 interacts with the silicate ions ($SiO_4^{2-}$) on the surface 412 of the sandstone formation 402 to attach the silicon oxide Janus nanosheets RPM 400 to the sandstone formation 402. After attaching to the sandstone formation 402, the second side 408 of the silicon oxide Janus nanosheets RPM 400 is oriented toward the pore space of the pore 404.

As illustrated in FIG. 4, the silicon oxide Janus nanosheets RPM 400 provides different permeability of the sandstone formation 402 depending on the fluid (that is, water or oil) in the pore 404. Line 414 of FIG. 4 is directed to the mechanism of the silicon oxide Janus nanosheets RPM 400 when water 416 is invading the pore 404, and line 418 of FIG. 4 is directed to the mechanism of the silicon oxide Janus nanosheets RPM 400 when oil 420 is invading the pore 404.

As shown in inset 422, when the water 416 is in the pore 404, the hydrophobic alkyl groups collapse and from a water resistant barrier 424 in the pore space of the pore 404 that impedes or completely blocks flow of the water 416. In some instances, after collapse of the alkyl groups, a capillary effect may act to flow the water 416 in the opposite direction of the water invasion, as shown by arrow 426. As shown by line 418, when oil 420 is in the pore 404, the hydrophobic alkyl groups enable flow of the oil 410 in the pore space of the pore 404.

Synthesis of Silicon Oxide Janus Nano Sheets RPM for Carbonate Formations

Figure 5:
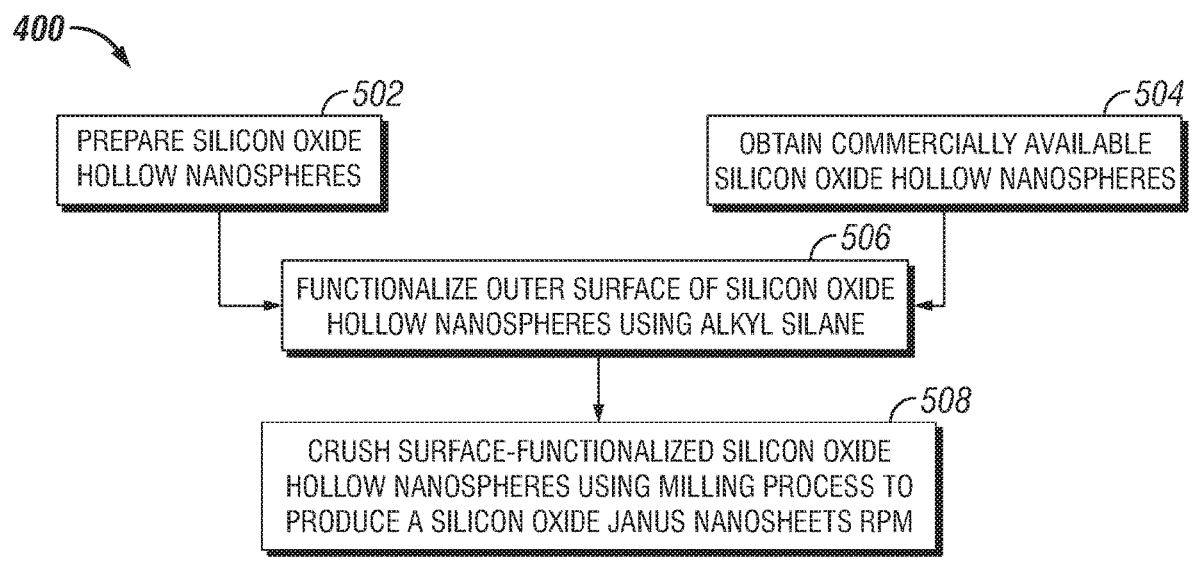
FIG. 5 is a block diagram of a process for the synthesis of a silicon oxide nanosheets RPM for a carbonate formation in accordance with an embodiment of the disclosure.

FIG. 5 depicts a process 500 for the synthesis of a silicon oxide nanosheets RPM in accordance with an embodiment of the disclosure. As discussed infra, silicon oxide nanosheets may be prepared from silicon oxide nanospheres. In some embodiments, silicon oxide hollow nanospheres may be prepared using template nanospheres (block 502). In such embodiments, template nanospheres (for example, polyvinylpyrrolidone (PVP)-stabilized polystyrene nanospheres) are prepared or obtained. Silicon oxide may be grown on the nucleation sites on the exterior surface by the template nanospheres, and the template nanospheres may be removed after growth of a desired coating of silicon oxide. For example, polystyrene template nanospheres may be removed by burning off the polystyrene core via heat treatment (such as heating to a temperature of at least 500° C.).

Figure 6:
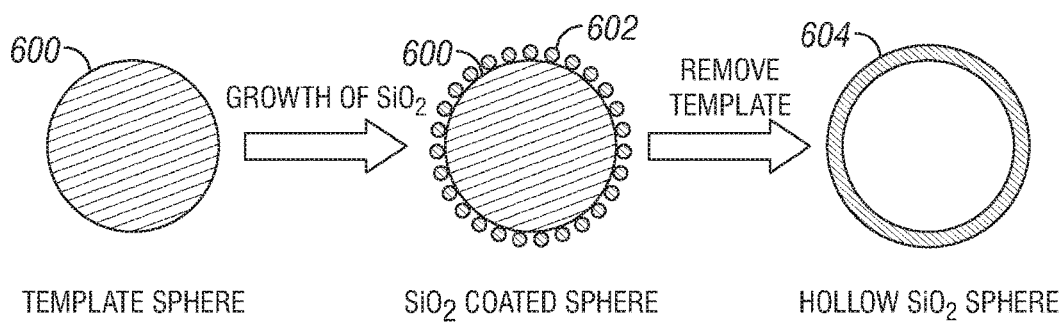
FIG. 6 depicts a chemical reaction scheme for producing a silicon dioxide hollow nanosphere in accordance with an embodiment of the disclosure.

FIG. 6 illustrates step 502 of the process 500 in accordance with an embodiment of the disclosure. As shown in FIG. 6, a template nanosphere 600 (for example, a polyvinylpyrrolidone (PVP)-stabilized polystyrene nanosphere) is obtained. Silicon oxide ($SiO_2$) is grown on the surface nucleation sites of the template nanosphere 600 to produce a silicon oxide-coated nanosphere 602 around the template nanosphere 600. The template nanosphere 600 is then removed (for example, by heat treatment) to produce a silicon oxide nanosphere 604.

In other embodiments, commercially available silicon oxide hollow nanospheres may be obtained (block 504). For example, in some embodiments, the silicone oxide hollow nanospheres may be obtained in nanopowder form from American Elements of Los Angeles, Calif., USA.

Next, the exterior surface of the silicon oxide nanospheres may be functionalized using an alkyl silane (block 506). In some embodiments, the alkyl silane may include octyltrimethoxysilane (OTMS), octadecyltrimethoxysilane (ODTMS), or a combination thereof. In some embodiments, the functionalization of the silicon oxide nanospheres with an alkyl silane is performing according to the following procedure: 1) disperse silicon oxide nanospheres in a 200 milliliters (ml) of dry toluene via a ball-milling process; 2) transfer the dispersion to a 500 ml three-necked flask with a mechanical stirrer and add an alkyl silane; 3) stir the mixture at a temperature of at least 90° C. under reflux for a time period of at least 48 hours; 4) collect the surface-functionalized silicon oxide nanospheres by centrifugation and wash with anhydrous ethanol; and 5) dry in a vacuum oven at a temperature of at least 80° C. for a time period of at least 24 hours.

Figure 7:
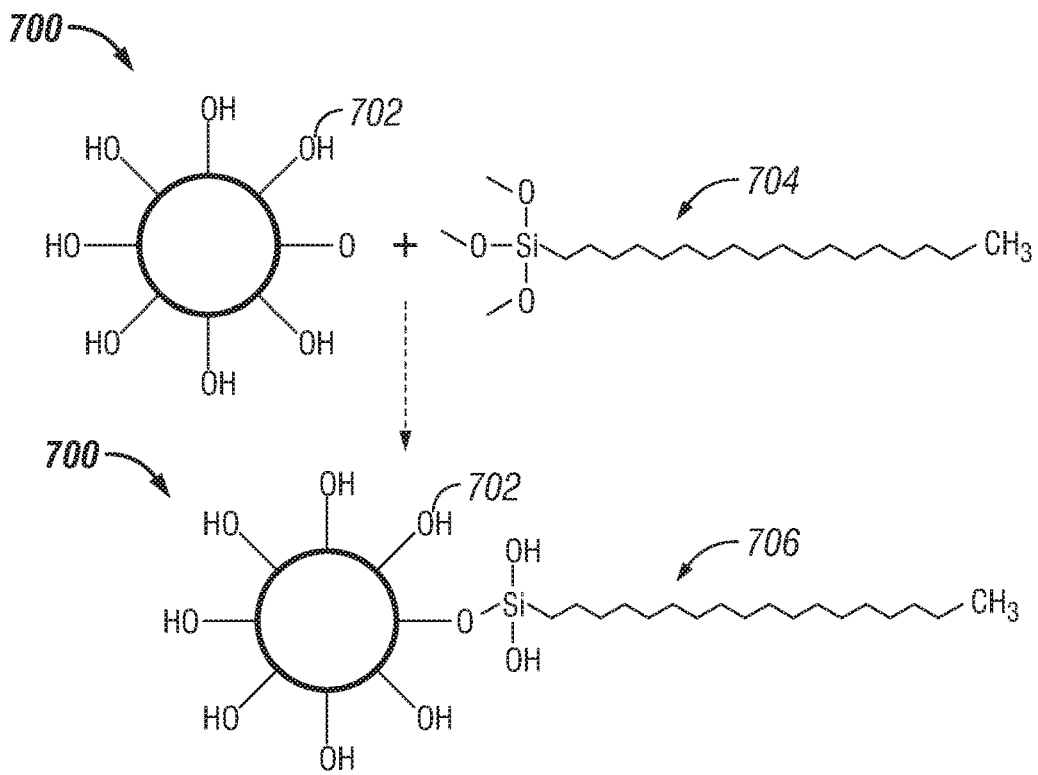
FIG. 7 depicts a chemical reaction scheme for functionalizing the exterior surface of a silicon dioxide nanosphere in accordance with an embodiment of the disclosure.

FIG. 7 illustrates step 506 of the process 500 in accordance with an embodiment of the disclosure. As shown in FIG. 7, a silicon oxide hollow nanosphere 700 may have an exterior surface that includes hydroxyl (OH) groups 702. An alkyl silane (for example, octadecyltrimethoxysilane 704 as shown in FIG. 7) may be added to the silicon oxide hollow nanosphere 700 (such as in a dispersion containing the silicon oxide hollow nanosphere). The octadecyltrimethoxysilane 704 bonds to surface of the silicon oxide hollow nanosphere 700 via interaction with the hydroxyl (OH) groups 702 to form an alkyl group 706 on the exterior surface of the silicon oxide hollow nanosphere 700.

As shown in FIG. 5, the surface-functionalized silicon oxide nanospheres may be crushed using a milling process to produce the silicon oxide Janus nanosheets RPM (block 508). The silicon oxide nanospheres may be crushed using a colloid milling process. In such embodiments, the cross-sectional dimensions of the nanosheets may be tunable by adjusting the mill spacing the between the rotators of the mill and adjusting the milling time. For example, to decrease the cross-sectional dimensions of the nanosheets, the spacing between the rotators may be decreased. After crushing, the resulting silicon oxide Janus nanosheets RPM may have a hydrophobic side of alkyl groups (from the alkyl silane functionalization) and the other side having the silanol groups.

Synthesis of Silicon Oxide Janus Nano Sheets RPM for Sandstone Formations

Figure 8:
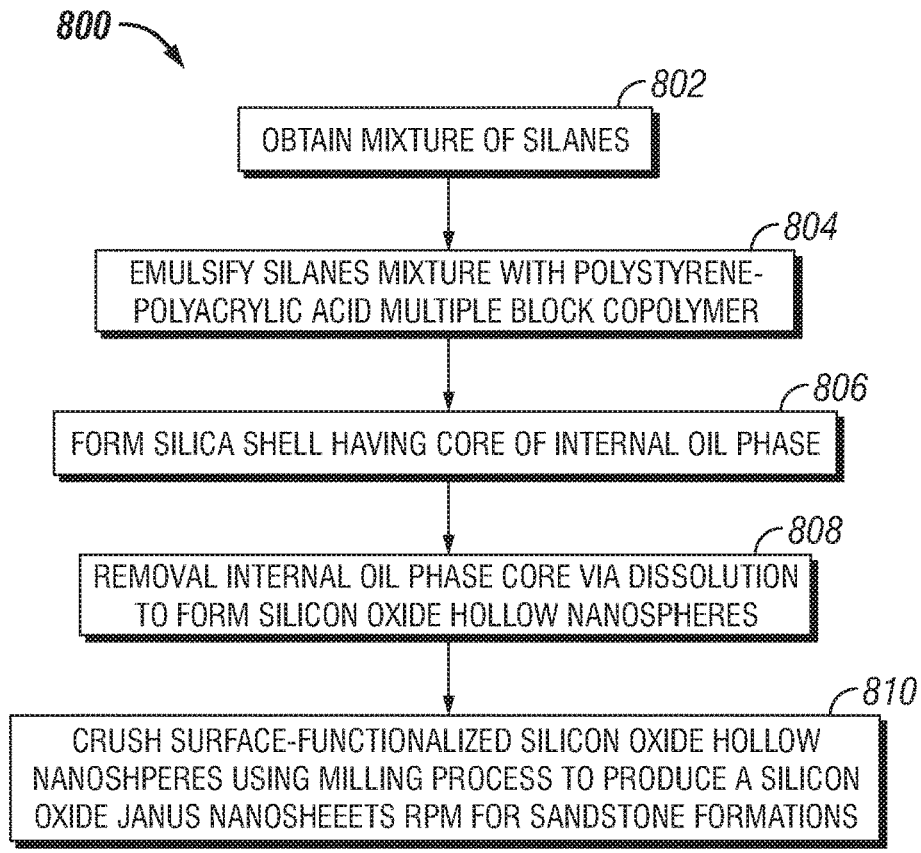
FIG. 8 is a block diagram of a process for the synthesis of a silicon oxide nanosheets RPM for a sandstone formation in accordance with an embodiment of the disclosure.

FIG. 8 depicts a process 800 for the synthesis of a silicon oxide nanosheets RPM for a sandstone formation in accordance with an embodiment of the disclosure. As will be appreciated, the synthesis described in process 800 is a one-pot synthesis. Initially, a silane oil mixture having an alkyl silane may be prepared (block 802). In some embodiments, the oil-silane mixture may include tetraethoxysilane (TEOS) and amido-propyltrimethoxysilane (APTMS). In some embodiments, the alkyl silane is octadecyltrimethoxysilane (ODTMS).

Figure 9:
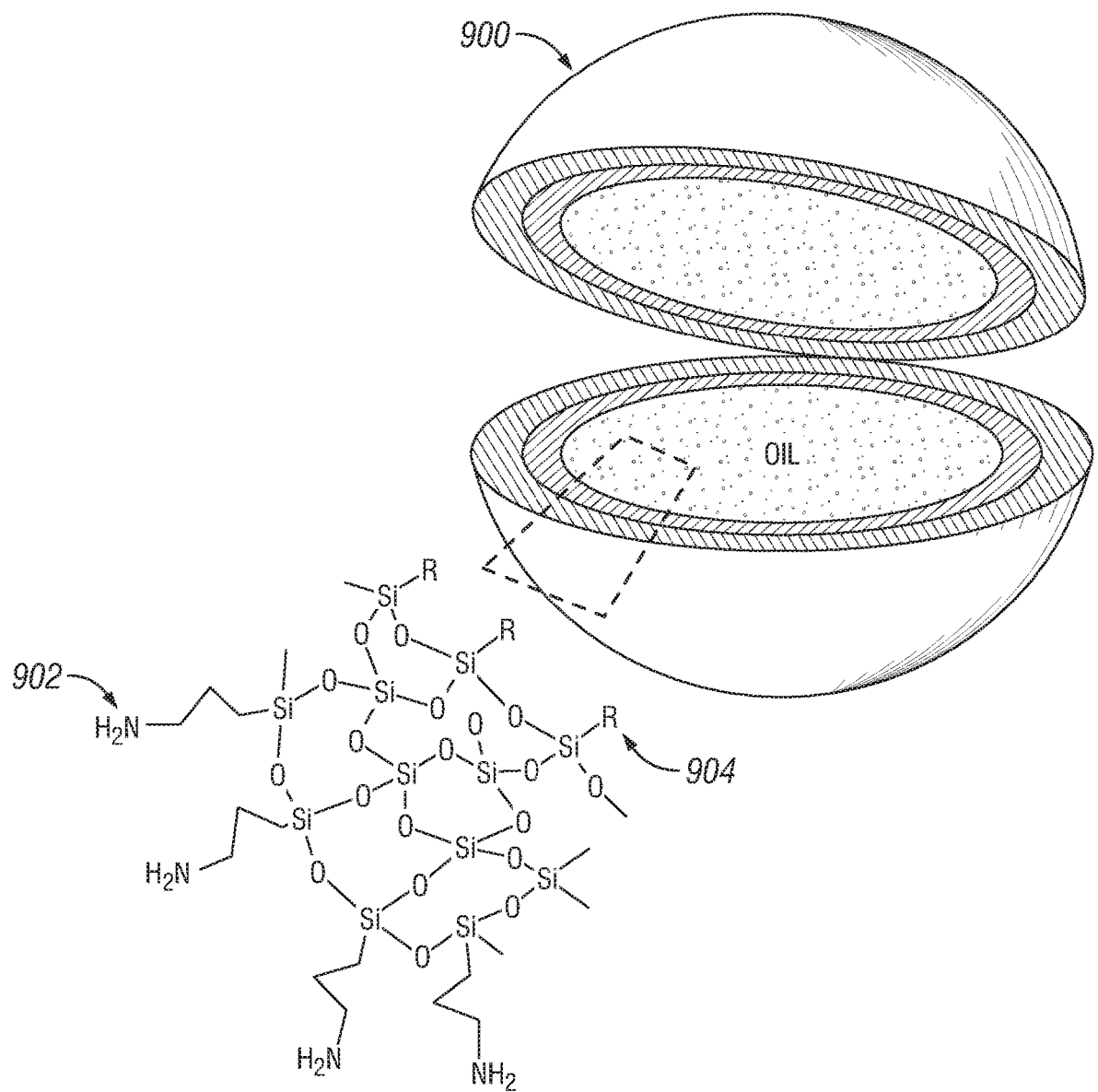
FIG. 9 depicts an example droplet having an oil core and a Janus interface in accordance with an embodiment of the disclosure.

The oil-silane mixture may be emulsified with a polystyrene-polyacrylic acid multiple block copolymer such that the oil-silane mixture is dispersed in the continuous aqueous phase (block 804). The droplet size of the emulsion may be controlled by varying the concentration of the copolymer. Under the acidic conditions, a sol-gel is created at the emulsion interface. The particles of the sol-gel form spheres with a silicon oxide shell having an oil core and a Janus interface (block 806) that includes external hydrophilic surface and an interior oleophilic surface. The external hydrophilic surface includes amino groups or amines, and the internal oleophilic surface includes alkyl groups. FIG. 9 depicts an example sphere formed in the emulsion according to the process 800. As shown in FIG. 9, the interface 900 of the emulsified droplet may be a Janus interface of an exterior hydrophilic surface 902 having amino groups and an interior oleophilic surface 904 having alkyl groups R (for example, a C21 alkyl group produced from the example alkyl silane octadecyltrimethoxysilane (ODTMS)).

Next, the internal oil core of the spheres may be dissolved to form silicon oxide hollow nanospheres having an exterior surface with amino groups or amines and an interior surface with alkyl groups (block 808). For example, in some embodiments, the solvent may be hexane. As shown in FIG. 8, the silicon oxide nanospheres may be crushed using a milling process to produce the silicon oxide Janus nanosheets RPM for sandstone formations (block 810). The silicon oxide nanospheres may be crushed using a colloid milling process. In such embodiments, the cross-sectional dimensions of the nanosheets may be tunable by adjusting the mill spacing the between the rotators of the mill and adjusting the milling time. For example, to decrease the cross-sectional dimensions of the nanosheets, the spacing between the rotators may be decreased. After crushing, the resulting silicon oxide Janus nanosheets RPM may have a hydrophobic side of alkyl groups and a cationic side having amino groups or amines.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A silicon oxide Janus nanosheet relatively permeability modifier (RPM), comprising:
    a silicon oxide nanosheet having a first side and a second side,
    a functional group bonded to the first side, the functional group selected from the group consisting of $NH_2$ and an amine; and
    an alkyl group linked to the second side, the alkyl group selected from the group consisting of a C8-C30 alkyl.

2. The silicon oxide Janus nanosheets RPM of claim 1, wherein the alkyl group is bonded to the second side by an oxygen atom.

3. The silicon oxide Janus nanosheets RPM of claim 1, wherein the degree of hydrophobic alkyl functionality of the second side is in the range of 0.01 weight (wt) % to 40 wt %.

4. The silicon oxide Janus nanosheets RPM of claim 1, wherein the silicon oxide nanosheet has a thickness in the range of in the range of 24 nanometers (nm) to 95 nm.

5. A method of manufacturing a silicon oxide Janus nanosheet relatively permeability modifier (RPM), comprising:

preparing a silicon oxide nanosphere, wherein preparing the silicon oxide nanosphere comprises:
  preparing a template nanosphere comprising a polystyrene nanosphere;
  growing silicon oxide on a nucleation site on a surface of the template nanosphere; and
  removing the template nanosphere via heat;
functionalizing the surface of the silicon oxide nanosphere using an alkyl silane to produce a surface-functionalized silicon oxide nanosphere; and
crushing the surface-functionalized silicon oxide nanosphere to form the silicon oxide Janus nanosheets RPM, the silicon oxide Janus nanosheets RPM comprising:
  a silicon oxide nanosheet having a first side and a second side;
  a functional group bonded to the first side, the functional group selected from the group consisting of COOH, COO⁻, OH, or O⁻;
  an alkyl group linked to the second side, the alkyl group selected from the group consisting of a C8-C30 alkyl.

6. The method of claim 5, wherein the alkyl group is bonded to the second side by an oxygen atom.

7. The method of claim 5, wherein the degree of hydrophobic alkyl functionality of the second side is in the range of 0.01 weight (wt) % to 40 wt %.

8. The method of claim 5, wherein the alkyl silane comprises octyltrimethoxysilane (OTMS) or octadecyltrimethoxysilane (ODTMS).

9. A method of manufacturing a silicon oxide Janus nanosheet relatively permeability modifier (RPM), comprising:

preparing an oil-silane mixture comprising an alkyl silane;
adding a polystyrene-polyacrlic acid block copolymer to the oil-silane mixture to prepare an emulsion, the emulsion comprising a droplet having an external hydrophilic surface and an interior oleophilic surface;
dissolving an oil core of the droplet in a solvent to form a silicon oxide hollow nanosphere; and
crushing the silicon oxide hollow nanosphere to form the silicon oxide Janus nanosheets RPM, the silicon oxide Janus nanosheets RPM comprising:
  a silicon oxide nanosheet having a first side and a second side;
  a functional group bonded to the first side, the functional group selected from the group consisting of $NH_2$ and an amine; and
  an alkyl group linked to the second side, the alkyl group selected from the group consisting of a C8-C30 alkyl.

10. The method of claim 9, wherein the alkyl group is bonded to the second side by an oxygen atom.

11. The method of claim 9, wherein the alkyl silane comprises octyltrimethoxysilane (OTMS) or octadecyltrimethoxysilane (ODTMS).

12. The method of claim 9, wherein the oil-silane mixture comprises tetraethoxysilane (TEOS) and amido-propyltrimethoxysilane (APTMS).

13. The method of claim 9, wherein the solvent comprises hexane.

* * * * *